United States Patent Office 3,080,157
Patented Mar. 5, 1963

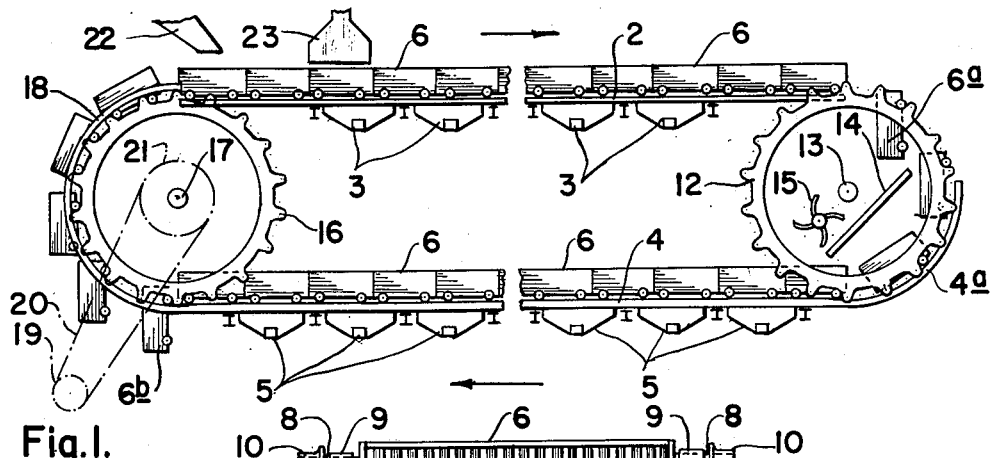
Fig.1.
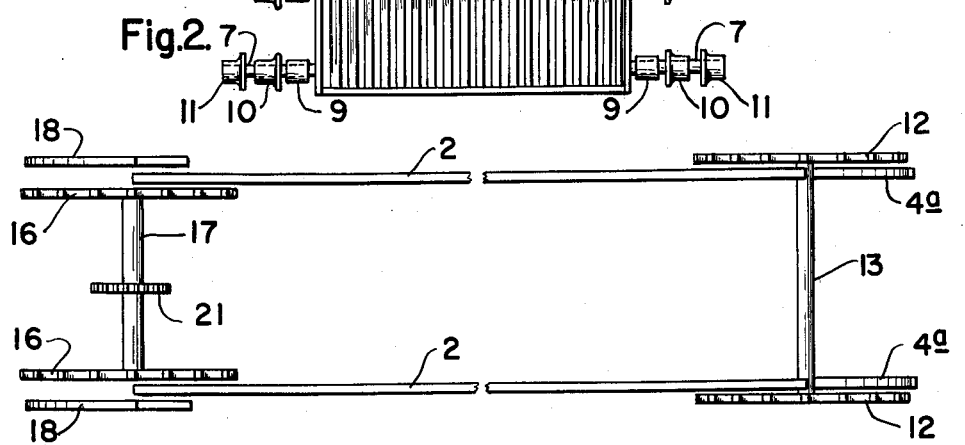
Fig.2.
Fig.3.
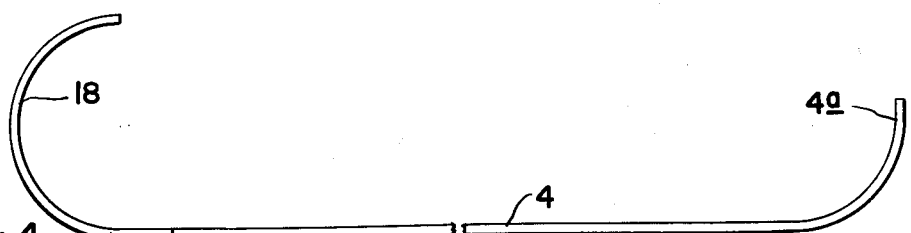
Fig.4.
Fig.5.
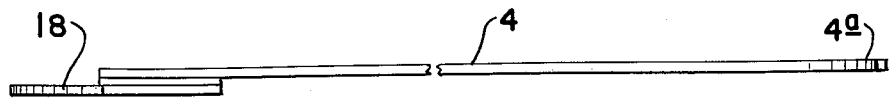

3,080,157
SINTERING APPARATUS
John A. Anthes, Bethel Borough, Pa., assignor to Dravo Corporation, Pittsburgh, Pa., a corporation of Pennsylvania
Filed Jan. 12, 1959, Ser. No. 786,238
2 Claims. (Cl. 266—21)

This invention relates to the sintering of ores and is for an improved sintering apparatus in which both the burning of the sinter and the cooling of the sinter is accomplished in the same apparatus.

The usual sintering apparatus comprises a supporting structure having rails that extend in a generally horizontal direction, and which support a series of tray-like pallets in which the charge to be burned is placed. The pallets move along the rails from the feed end of the structure to the discharge end, and as they travel over the rails from one end to the other, they move over wind boxes through which air or heated gases are drawn down through the charge to effect the sintering in a manner well known in the art. At the discharge end of the structure the pallets or trays are tilted to discharge the burned sinter, and the pallets, relieved of their charge, are returned in an inverted position to the feed end, the return track for the pallets being directly under the wind boxes and the aforesaid rails. As generally constructed, there are a pair of sprocket wheels at the feed end of the structure which raise the pallets as they return to the feed end of the rails, and there is another pair of sprockets and/or a curved track at the discharge end of the structure through which the tilting of the pallets to discharge of sinter is effected, and by which they are lowered from the rails to the return track.

According to the present invention the sintering is accomplished by the movement of the pallets in the conventional way along the upper part of the structure, but at the discharge end the pallets, after being emptied, are transferred to the return rails in an upright position and sinter from a succeeding pallet which has been burned and is still hot is charged into them. Means are provided along the return track for circulating cooling gases through the pallets to cool the sinter, and at the end of the return track the trays are again tilted to discharge the then-cooled sinter, after which the trays are then transferred to the feed end of the sintering run to be recharged, and the cycle repeated. By so utilizing the return movement of the trays from the discharge end to the feed end to cool the sinter, considerable floor area is conserved, and the same equipment, with very little added cost, performs the double function of sintering and cooling, eliminating the need for the separate large cooling installations presently required.

A further object of the present invention is to provide an arrangement in which the sinter being discharged from one pallet is dumped into a previously emptied pallet so that the rate of cooling is automatically coordinated with the rate of burning.

A further object of the invention is to provide a structure of this kind in which the operation is entirely automatic, and after the machine is set into operation, requires no continuous manual labor.

My invention may be more fully understood by reference to the accompanying drawings, in which the apparatus is schematically illustrated, and in which:

FIG. 1 is a schematic side elevation of a sintering apparatus embodying my invention;

FIG. 2 is a top plan view of one of the sintering pallets;

FIG. 3 is a top plan view of the track and sprocket arrangement of the apparatus shown in FIG. 1;

FIG. 4 is a side elevation of the bottom rail assembly removed from the remainder of the apparatus; and FIG. 5 is a plan view of the bottom rail assembly removed from the apparatus.

Since my invention pertains to the general organization of the apparatus and not to the construction of the particular parts, the invention is best shown by a schematic illustration in which only the important elements of the machine are shown. In the drawings, 2 designates a pair of parallel horizontally-extending top rails, and 3 indicates a series of wind boxes supported under the top rails, and of a type well known in the art. As viewed in FIG. 1, the left-hand end is the feed end of the apparatus, and the opposite end is the discharge end.

Below the upper pair of rails 2 there is a return track provided by parallel rails which also extend horizontally, and which are designated 4. A series of wind boxes 5 are associated with and extend below the rails 4. There is a series of pallets or sintering trays 6, each one being a separate unit. These pallets are of the general construction well known to the art, being generally rectangular in shape. Their long axis extends transversely to the length of the rails 2 and 4. They have an end wall at each end, but are without walls along their sides. A grate forms the bottom of the pallet. According to the present invention, each pallet is provided at each end forwardly of its longitudinal center line with a long stub shaft 7. Also on each end of the pallet rearward of its longitudinal center line is a second short stub shaft 8. There are rollers 9 on the stub shafts 7 and 8 at each end of the pallet close to the end wall thereof. Beyond this the two stub shafts have track-engaging wheels 10 which are in alignment with each other. The long stub shaft 7 at each end has still a third wheel 11 at its outer end. The wheels 10 which are aligned to follow or track one another and the wheels 11 on the outers ends of the long shaft are flanged wheels. For clarity of illustration, the relative size and spacing of the shafts and wheels are exaggerated in FIG. 2.

At the discharge or finishing end of the upper rails there are a pair of parallel sprocket wheels 12 carried on a shaft 13. The upper rails 2 terminate at about the vertical center of the sprocket wheels 12 and are generally in a position tangential to the peripheries of these wheels, the sprocket teeth of the wheels projecting beyond their peripheries. The wheels 10 on the pallets moving along the upper rails 2 ride on these rails and hold the pallets in the normal level position in which they travel over the wind boxes 3. The sprocket wheels 12 are so spaced that when the wheels 10 run off the tracks 2 at the discharge or finish end of the upper rails, the wheels 11 at the outer ends of the longer stub shaft 7 will be engaged between the teeth of the sprocket wheels 12. As a result the pallet is supported at only one side of its longitudinal center, so that as it clears the rails 2 it swings down to the vertical position shown by the pallet 6a in FIG. 1.

The bottom rails 4 as best shown in FIG. 4 have upwardly-curved extensions 4a at the beginning end thereof which extend up to the horizontal center line of the sprocket wheels 12, being generally concentric with these wheels although spaced closer together than the wheels 12, and since the spacing of the rails 4 is the same as the spacing of the rails 2, these upwardly-curved extensions will serve to engage the wheels 10 on the pallets and guide them onto the return rails 4 along which they again move in a substantially level horizontal direction under the upper reach of the conveyor structure.

In dropping from the horizontal position at the discharge end to the position shown at 6a, the sinter which has been burned is dumped from the tray. It falls upon an apron or chute 14 so as to be guided by this chute into a previously emptied tray, at the right-hand end of the horizontal rails 4. A sinter breaker such as is commonly known in the art is indicated at 15. It has arms positioned to strike the sinter as it moves down the chute 14 and break the sinter. A screen (not shown) may be incorporated in the chute 14. It will be seen that in being transferred from the upper to the lower level, the pallets are not inverted, but their direction of travel is reversed.

At the feed end of the structure, which is the finish end of the lower rails 4, there is another pair of sprocket wheels 16 on a shaft 17, these sprocket wheels being spaced closer together than the sprocket wheels 12, these sprockets being spaced to engage the rollers 9 on the stub shafts of the pallets. The wheels 12 may be designated wide spaced sprockets and the wheels 16 narrow spaced sprockets. The bottom rails 4 terminate at or near the vertical center line of the sprockets 16. There are a pair of curved guide rails 18 that are concentric with the sprocket wheels 16. They are spaced apart the same distance as the sprocket wheels 12 and their lower ends lap past the rails 4. When the rollers 10 on the pallets ride off the return tracks 4 at the feed end of the structure, the wheels 11 will support the trays on the tracks 18, causing the pallets to swing down to a vertical position as indicated at 6b in FIG. 1. The sinter which has been cooled in the return travel of the pallets over the wind boxes 5 is thus dumped out of the pallets as they swing down to a vertical position as indicated at 6b. The teeth of the sprocket wheels 16 will engage the rollers 9 on the stub shaft 7 to move the pallets through the various positions shown at the feed end of the structure, while the curved rails 18 cooperating with the rollers 11 will guide the pallets into a position generally tangent to the sprocket 16 when the sprocket teeth will then engage rollers 9 on both the stub shafts 7 and 8, and the pallets will be restored to an upright position as they are pushed onto the feed end of the rails 2. It will be seen that the wheels 10 engage the upper and lower track rails, the wheels 9 come into use only at the head end, and the wheels 11 provide the tilting support for the pallets.

The shaft 17 is driven from any suitable source of power, such a drive being schematically illustrated in FIG. 1 at 19, which represents a power-driven sprocket driving a chain 20 that engages a sprocket 21 on the shaft 17. The pallets are moved from the feed end of the upper rails toward the discharge end by the pressure of each pallet pushing against the preceding one, and such pushing of the pallets off the discharge end of the rails 2 onto the sprockets 12 will effect a rotation of these sprockets also, and the transferring of the trays or pallets to the return track will similarly push the pallets along the return track to the feed end of the structure where they are again engaged by the driven sprockets 16. However, if desired a drive may be provided for sprockets 12 synchronized with the drive for sprockets 17.

To complete the explanation, 22 represents chute means for delivering a charge to the pallets in the usual manner, and 23 represents an igniting hood under which the charge is moved and the burning of the fuel in the top of the charge initiated. Each of the wind boxes 3 leads to a source of suction so that combustion air and products of combustion are drawn down through the bed, as is well understood in the art. On the return travel of the pallets, cooling air may be drawn down or blown up through the charge in the pallets to accelerate cooling, and the wind boxes 5 are connected to fans or blowers through duct work provided for this purpose.

My invention therefore provides apparatus for cooling as well as burning the sinter The top rails, sprocket wheels, wind boxes and pallets, without the extra wheels are usual in the art, as is the return track for the pallets, so that very little change need be made in existing types of equipment to apply my invention thereto. At relatively little added initial cost, cooling is made feasible and much added handling equipment is eliminated, and it is possible to remove the cooled sinter at the same end as the end at which the feed materials are charged. The automatic dumping of sinter from one tray into a previously emptied tray on the return reach assures that the cooling will keep pace with the burning and the transfer of the hot material is by gravity, eliminating any expensive conveyor system for handling the hot sinter.

It will be understood that various changes and modifications may be made in the invention and the detailed construction and arrangement of parts, without, however, departing from my invention as defined in the following claims.

I claim:

1. A sintering machine comprising an upper and a lower series of separate pallets in abutting relation movable in opposite directions from a beginning to a finishing end, upper and lower series of wind boxes over which the upper and lower series of pallets move respectively, each pallet having a long stub shaft and a short stub shaft at each end thereof, an upper pair of horizontal rails and a lower pair of horizontal rails, the stub shafts at each end of each pallet having tracking wheels spaced to travel on said rails at each level and keep the pallets in a horizontal position, the long stub shaft of each pallet having an outer wheel thereon, wide-spaced sprocket wheels at the finishing ends of the upper rails positioned to engage only the outer wheels on the long shafts of said pallets whereby each pallet tilts to a vertical position after it leaves the upper rails and is supported only by the sprocket wheels, the sprocket wheels being positioned to receive the pallets in succession from the upper rails and transfer them to the beginning end of the lower rails, a pair of narrow spaced sprocket wheels at the opposite end of the machine positioned to engage the stub shafts of the pallets between the tracking wheels thereof and the ends of the pallets for elevating the pallets of the lower series from the finish end to the upper horizontal rails at the beginning of the upper series, and curved rails extending from the finish end of the lower rails and which are concentric with the narrow spaced sprocket wheels positioned to engage only the outer wheels of said long stub shafts whereby the pallets tilt to a vertical position after their tracking wheels leave the lower horizontal rails and are supported only by said curved rails, and means for driving one pair of sprocket wheels.

2. A sintering machine as defined in claim 1 wherein the lower horizontal rails have curved extensions at their beginning end which are concentric with the wide spaced sprockets for engaging the tracking wheels of the pallets and restoring them to an upright position.

References Cited in the file of this patent

UNITED STATES PATENTS

| 1,075,011 | Christensen | Oct. 7, 1913 |
| 1,568,791 | Aiken | Jan. 5, 1926 |
| 2,750,274 | Lellep | June 12, 1956 |
| 2,768,890 | Cover | Oct. 30, 1956 |
| 2,853,288 | Hudson | Sept. 23, 1958 |
| 2,987,307 | Homan | June 6, 1961 |

FOREIGN PATENTS

| 278,861 | Germany | July 15, 1913 |
| 618,184 | Germany | Sept. 5, 1935 |
| 441,443 | Great Britain | Jan. 20, 1936 |
| 1,093,611 | France | May 6, 1955 |